Oct. 25, 1966 P. LARUE 3,280,566
SOLID PROPELLANT ROCKET MOTORS
Filed July 15, 1963 5 Sheets-Sheet 1

Oct. 25, 1966 P. LARUE 3,280,566
SOLID PROPELLANT ROCKET MOTORS
Filed July 15, 1963 5 Sheets-Sheet 5

United States Patent Office 3,280,566
Patented Oct. 25, 1966

3,280,566
SOLID PROPELLANT ROCKET MOTORS
Pierre Larue, Chatenay-Malabry, France, assignor to Office National d'Etudes et de Recherches Aerospatiales, Chatillon Bagneux (Seine), France, a French society
Filed July 15, 1963, Ser. No. 294,832
Claims priority, application France, July 19, 1962, 904,546
21 Claims. (Cl. 60—253)

The present invention relates to rocket motors making use of a solid propellant, and in particular to high performance rocket motors intended to work at very high altitude, which is the case in particular of the last stage of a multi-stage rocket.

The present invention is concerned with such rocket motors wherein the propelling charge is in the form of a block or mass at least one end of which is in the form of a half spheroid having a free surface, hereinafter called "ignition surface," in communication with the surrounding atmosphere through at least one nozzle.

The chief object of the present invention is to provide a rocket motor of this type which is better adapted to meet the requirements of practice, in particular concerning the manner in which the propellant burns and the law of variation of the thrust supplied by such a motor.

The rocket motor with which the present invention is concerned comprises a propellant charge fitted in a shell at least one end of which is in the form of a half spheroid, this charge having a free surface, forming its ignition surface, adapted to communicate with nozzle means opening into the atmosphere, and, according to the present invention the propellant charge in said end comprises at least two different portions made of propellant powders of different respective velocities of combustion, to wit a fast burning portion and a slow burning portion, the ignition surface being shaped so that it is located on both of said portions and the surface of separation between said two portions being so shaped in relation to said ignition surface as to form no sliver that tends to drag out the burnout of the motor and thus to produce an undesirable operating condition.

It should be well understood that the term "spheroidal" designates both spherical surfaces and surfaces approximating them but always of revolution about at least one axis, and possibly elongated in the direction of propulsion. For instance, such a surface may be generated by the rotation, about said axis, of a curved line comprising end portions in the form of circular arcs having their respective centers on said axis and side portions in the form of curves tangent to each of said end portions and joining them together (the term "curve" including the case of a straight line).

Preferred embodiments of the present invention will be hereinafter described with reference to the appended drawings, given merely by way of example, and in which.

Figure 1:
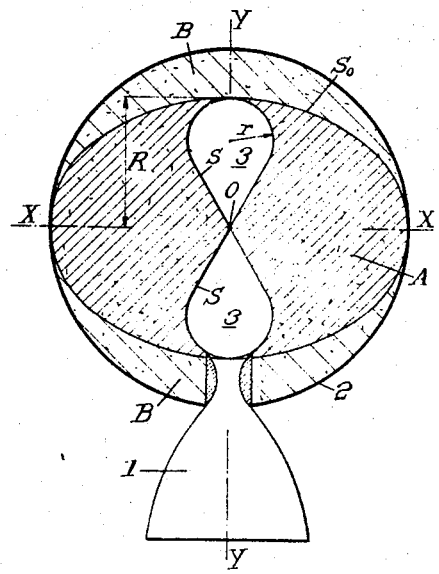
FIG. 1 is an axial diagrammatic sectional view of a rocket motor made according to a first embodiment of the invention.

The propelling charge of a rocket motor according to the present invention has at least one end thereof in the form of a half spheroid, the term "spheroid" being taken in the meaning above stated. In particular the invention will apply to the case of a block of ellipsoidal or oval shape (FIGS. 11 to 16).

The propellant block has an ignition surface S adapted to communicate with the surrounding atmosphere through at least one nozzle 1 for the outflow of the combustion products, said nozzle being carried by a shell 2, which is for instance of metal or of a suitable plastic material. Said ignition surface S, over the whole area of which the propellant charge is to be ignited, is the initial surface of a combustion which travels perpendicularly to said surface until the propellant block has been wholly burned.

The essential features of the invention, which are common to all the embodiments of the invention illustrated by FIGS. 1 to 16 inclusive are as follows:

(a) The propellant block comprises at least two distinct portions A and B consisting respectively of a powder having a high combustion velocity and a powder having a lower combustion velocity, hereinafter called "fast burning powder" and "slow burning powder," respectively. For instance, the fast burning powder may be a composite powder (such as a mixture of a perchlorate powder and of a binder) with the addition of a combustion accelerator and the slow burning powder may be a composite powder (such as the preceding one) but without a combustion accelerator or possibly including a combustion moderator;

(b) Portions A (fast burning powder) and B (slow burning powder) form a block, which may be obtained, possibly by successively casting these portions, or by glueing of pre-established elements, etc;

(c) Said portions A and B are arranged, both concerning their respective shapes and their relative positions, in such manner that the ignition surface S (initial combustion surface) is located on both of portions A and B. Preferably this surface is located essentially on portion A and only to a small degree, not exceeding 10%, on portion B, where it may be reduced to a line or even to a point.

It should be noted that, when there is provided a passage distinct from the ignition surface S to connect said ignition surface S with nozzle 1, said passage extending through one of the powder portions A or B, the wall of this passage should be inhibited, that is to say coated with a lining preventing ignition therethrough.

It should be understood that the factors which are available for determining the structure of a composite propelling charge such as above described comprise the ratio $k$ of the respective velocities of combustion of the fast burning powder and of the slow burning powder, respectively, and the geometrical characteristics of said charge, in particular the shape of its ignition surface S.

As a matter of fact, starting from a predetermined ignition surface having a predetermined location with respect to the propellant block, it will be possible, account being taken of the respective combustion velocities of the two powders to find the respective shapes to be given to the portions A and B of said block and in particular to determine the shape of the separation surface $S_o$ between said portions.

Concerning the desired operation of the rocket motor it should be pointed out that one of the aims to be reached may be to obtain "neutrality" of said motor, that is to say a constant value of the thrust it develops.

In order to determine the separation surface, two solutions may be adapted.

According to a first solution, the respective flame fronts in the fast burning powder and in the slow burning powder travel independently of each other in the fast burning powder and in the slow burning powder, respectively, and constantly join each other on the separation surface $S_o$. Determination of this surface is then obtained by the intersection of surfaces parallel to the portions of the ignition surface S that correspond respectively to the fast burning powder and to the slow burning powder. The tangent at every point to the generatrix of the separation surface $S_o$ may be obtained by analogy with the method of Huygens (as known in optics) by considering the powders as isotropic mediums of respective indexes 1 and $k$.

According to another solution, separation surface $S_o$ is chosen in advance.

In this last solution the flame front in the fast burning powder travels faster and gradually ignites, along the separation surface $S_o$, the slow burning powder, in which the flame front travels slower, thus creating a connecting combustion zone.

Of course the separation surface $S_o$ may be inhibited and, in this case, the flame front in the fast burning powder and in the slow burning powder respectively travel independently of each other without joining each other on the separation surface $S_o$.

Several series of examples of rocket motors made according to the above stated features will now be described.

A first series of examples, illustrated by FIGS. 1 to 5 and 11 to 16 inclusive, relates to the case where the ignition surface S is constituted by the wall of a recess 3 provided in the fast burning powder A, which is surrounded by the slow burning powder B, said ignition surface S then having only either linear or punctual contacts with the separation surface $S_o$ between said portions A and B.

Furthermore, for the examples of FIGS. 1–5 of this first series, the center of recess 3 coincides with the center O of the sphere and the wall of said recess, that is to say ignition surface S is a surface of revolution obtained by rotation of a $n$ branch curve located in a diametral plane of the sphere and having at least two symmetry axes intersecting each other at the center O of said sphere, said rotation taking place about either of the symmetry axes of this curve.

Finally, in the case of said examples of FIGS. 1 to 5, the passage between recess 3 and nozzle 1 is advantageously located along the axis of one of the branches of the curve the rotation of which generates the wall of said recess. Said passage is then located in the slow burning portion B and it may contain the whole or a portion of said nozzle. Of course when this passage includes free surfaces, i.e. surfaces along which the nozzle does not extend, these surfaces must be coated with an inhibitor.

FIG. 1 shows a rocket motor wherein recess 3 is generated in the fast burning powder portion A by rotation of a two branch curve shaped as an eight about its transverse symmetry axis XX, the longitudinal symmetry axis YY of this curve coinciding with the thrust axis of the motor, that is to say with the axis of nozzle 1.

In order to obtain "neutrality" of the rocket motor, the fast burning powder portion A is given approximately the shape of an ellipsoid having its major axis along XX, tangent at the ends of this major axis to shell 2, the space between this ellipsoid and said shell 2 being filled with the slow burning powder B.

By way of indication, it may be pointed out, concerning this example of FIG. 1, that if R is the length of every curve branch and $r$ the radius of curvature of the end of said branch the ratio $r/R$ should have a value averaging 0.35, the ratio of the velocities of combustion of the fast burning powder and of the slow burning powder being close to 2.85 if it is desired to obtain a neutrality of the motor with an approximation of $\pm 3\%$.

A modification of this first example would consist in rotating the two branch curve about axis YY for determining the ignition surface.

Figure 2:
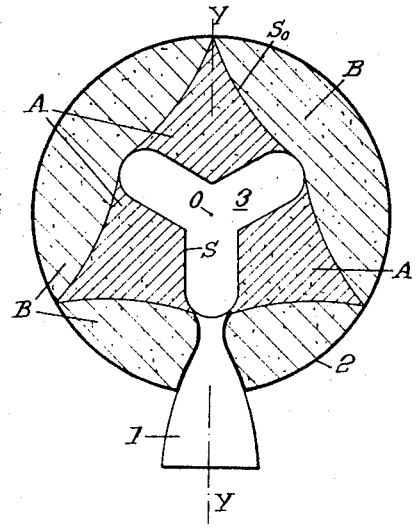
FIGS. 2, 3, 4 and 5 are views similar to FIG. 1 but illustrating four different modifications thereof, respectively.

In the example illustrated by FIG. 2 the motor also includes a single nozzle 1 and the curve for generating the ignition surface S has three branches the axis of one of which coincides with the thrust axis YY. This ignition surface S is generated by rotation of this curve about the symmetry axis YY. The separation surface $S_o$ between the fast burning powder A and the slow burning powder B is then generated by rotating about the same axis YY, a figure in the shape of a triangle having curvilinear sides tangent at their middle points respectively to the ends of the branches of the said curve and the apexes of which are located on the periphery of the sphere. The space between ignition surface S and separation surface $S_o$ is filled with the fast burning powder A whereas the space between separation surface $S_o$ and shell 2 is filled with the slow burning powder B.

It should be well understood that the sphere limiting the slow burning powder may have a greater radius, in which case the thrust of the rocket motor has an increasing value at the end of its combustion.

Figure 3:
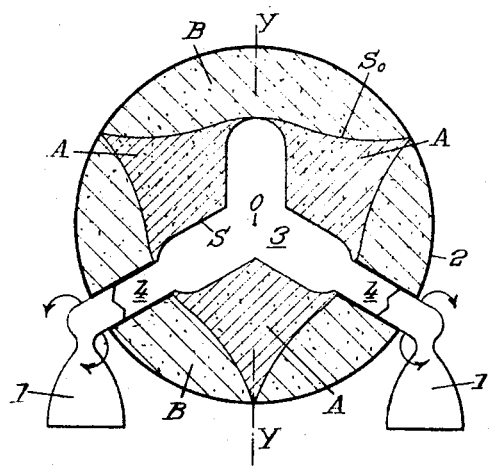

The example of FIG. 3 differs from the of FIG. 2 by the fact that the motor comprises several nozzles 1 for instance four nozzles communicating with recess 3 through passages 4 having their walls coated with an inhibitor lining and provided in the slow burning powder portion B, as shown by the drawings. Said nozzles may be used simultaneously for propelling and guiding purposes and/or for stabilizing purposes.

Figure 4:
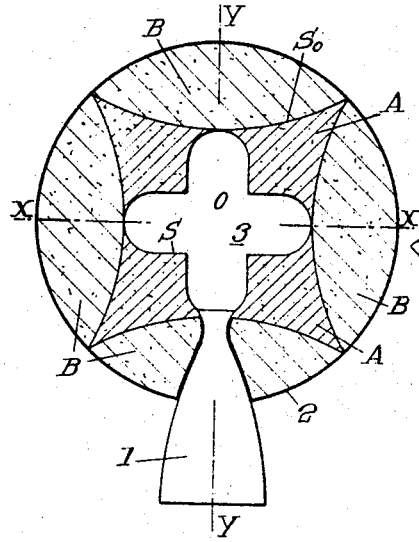

FIG. 4 is concerned with a rocket motor having a single nozzle 1 and wherein the ignition surface S is generated by rotation about one of its symmetry axes of a star shaped curve having four branches, two of these branches having their common axis in coincidence with the thrust axis YY. This thrust axis may be used as axis of rotation for generating the ignition surface S. The separation surface $S_o$ is then obtained by rotating about the same axis YY a quadrilateral having concave sides and the apexes of which are located on shell 2.

Figure 5:
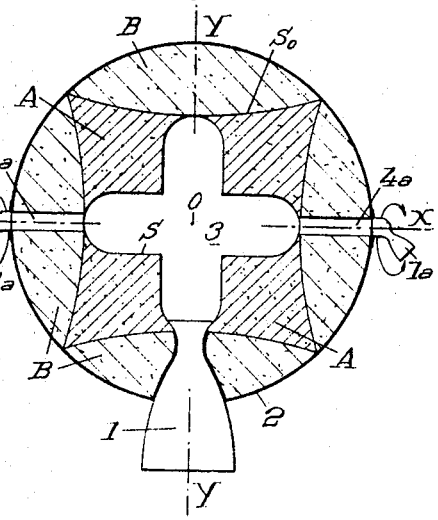

The rocket motor of FIG. 5 differs from the preceding one only by the fact that it comprises, in addition to the main propelling nozzle 1, stabilizing and/or guiding nozzles $1_a$ connected, through passages $4_a$ lined with an inhibitor substance and formed in the slow burning portion B, with the portions of recess 3 corresponding to the transverse branches of the star shaped curve.

It should be pointed out that the star shaped curve branches in the constructions of FIGS. 2 to 5 inclusive might have non parallel sides, for instance inclined and/or curvilinear sides.

It should be well understood that, in the embodiments of FIGS. 1 to 5 inclusive, it is possible to cut the structure by a meridian plane (i.e. by the plane of the figures) and the two halves may be moved away from each other and connected together by a cylindrical mass (including the two powders A and B in correspondence with the structures of said halves). The axis of this cylindrical mass is, for said mass, an axis of symmetry but not an axis of revolution.

Furthermore in embodiments where the spherical mass of powder has, in section, two axes of symmetry perpendicular to each other and the recess is such as to leave a substantial free space about center O, this spherical mass can be also be cut by an equatorial plane (XX) and the two portions connected together by a cylindrical mass of the same kind as in the preceding case. Examples of such an embodiment are given by FIGS. 4 and 5. The length of the cylindical mass is preferably at most equal to the diameter of shell 2.

Figure 6:
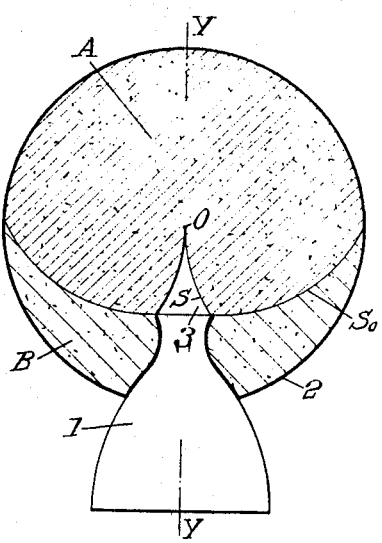
FIG. 6 is a diagrammatic axial sectional view of a rocket motor made according to another embodiment of the invention.
Figure 7:
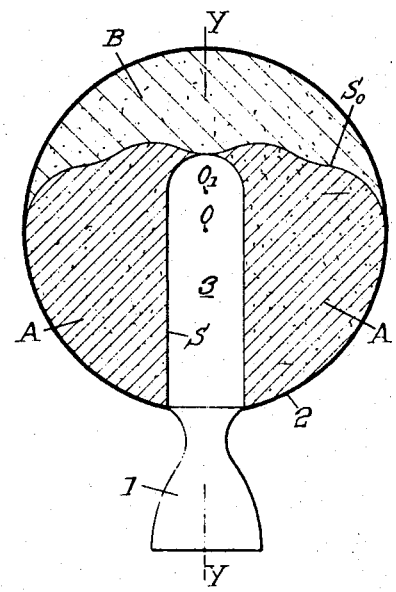
FIGS. 7 and 8 are views similar to FIG. 6 but illustrating two different modifications thereof, respectively.
Figure 8:
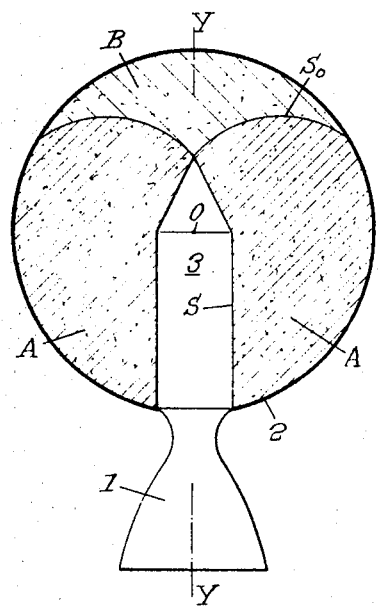

Another series of examples, illustrated by FIGS. 6 to 8 inclusive, is concerned with the case where the recess 3 limited by ignition surface S is eccentrically disposed with respect to the sphere. Preferably this recess is in the form of a body of revolution about the thrust axis YY and the section of said surface S by a plane passing through axis YY is a curve made as follows.

In the embodiment illustrated by FIG. 6, it is a curve the apex of which coincides with center O of the sphere.

In the embodiment illustrated by FIG. 8, it is a curve the apex of which is located beyond the center O of the sphere in the direction of the thrust.

In the embodiment illustrated by FIG. 7, the recess 3 is produced by the rotation about axis YY of a curve having a rounded portion at its intersection with said axis YY, said rounded portion having its concavity toward nozzle 1 and its center of curvature $O_1$ located beyond the center O of the sphere in the direction of the thrust.

The separation surface $S_o$ is then obtained by rotation about axis YY, of a curve three possible examples of which are illustrated by FIGS. 6, 7, and 8 respectively.

Figure 9:
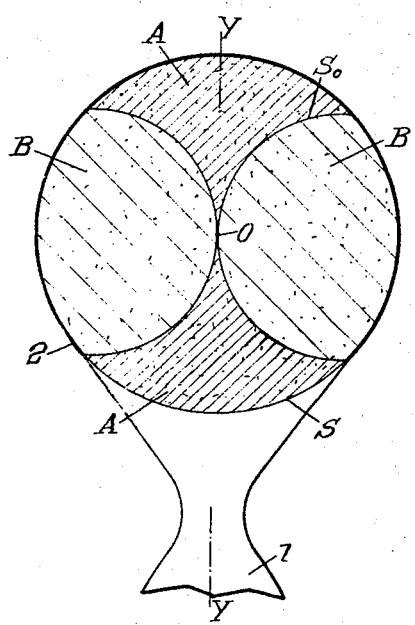
FIGS. 9 and 10 are diagrammatic axial sectional views of still two other embodiments of the invention, respectively.
Figure 10:
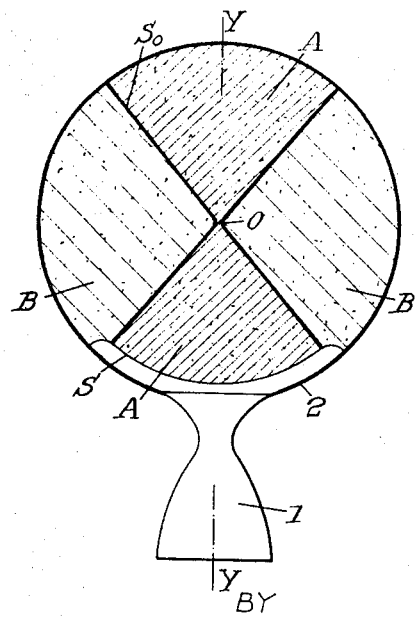

Another series of examples illustrated by FIGS. 9 and 10 is concerned with rocket motors where the ignition surface S is located either on the sphere which forms the external surface of the propelling charge (case of FIG. 9) or on a surface concentric with said sphere and at a small distance therefrom (case of FIG. 10). In both cases, said surface S is either wholly or at least chiefly constituted by a spherical cap having its axis in coincidence with axis YY.

In the case of FIG. 9, the portion of ignition surface S made of the slow burning powder consists only of the circle limiting said spherical cap and the separation surface $S_o$ between the two powder portions A and B is chosen at will, the fast burning powder portion A and the slow burning powder portion B being in intimate contact with each other over the whole area of said separation surface.

In the case of FIG. 10 the portion of the ignition surface S located on the slow burning powder is an annular concave zone and the separation surface $S_o$ is also chosen at will, but said separation surface $S_o$ is coated with an inhibitor substance.

It should be pointed out that it is only in the case where it is desired to obtain "neutrality" of the rocket motor that the diameter of the sphere must be limited to the most eccentric points of the fast burning powder portion A. If this neutrality condition were not imperative, it would be possible to increase the diameter of the sphere by providing at its periphery a concentric layer of slow burning powder.

It should be noted that in the embodiment of FIG. 10, the two portions of fast burning powder A communicate together through a small passage provided at center O.

Figure 11:
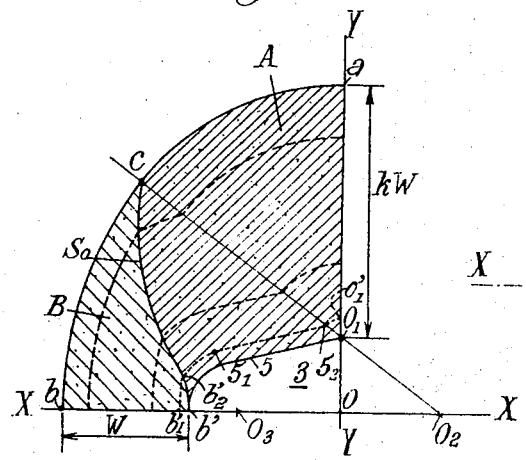
FIG. 11 is an explanatory view concerning the generation of spheroids.

FIG. 11 illustrates the principle of another embodiment of the invention.

In this case the longitudinal section of the outer surface of the powder block is a closed curve having two axes of symmetry perpendicular to each other and a quarter $ab$ of which is illustrated by FIG. 11, comprising a portion $ac$ in the form of a circular arc having its center at $O_1$ and a portion $cb$ in the form of a circular arc having its center at $O_2$.

The fast burning portion of the block is shown at A and the slow burning portion at B. The ratio of the burning velocity of the fast burning powder to the burning velocity of the slow burning powder is $k$. If W is the thickness, about axis XX, of the slow burning powder, the thickness of the fast burning powder along axis YY will be $kW$.

In the view of FIG. 11 the respective sections of the combustion surfaces for the fast burning powder A consist partly of circular arcs having their center at $O_1$. As for the slow burning portion B, the respective sections of the combustion surfaces are circular arcs having their center at $O_2$.

The ignition surface, or wall, of recess 3 has, in section by the meridian plane of FIG. 11, the shape of a curve including a circular arc $b'5$ having its center at a point $O_3$ which may be chosen at will on axis XX, the radius of said circular are being $O_3b'$, and a straight line portion $O_15$ making an angle smaller than 90° with the portion $OO_1$ of axis YY, the straight line portion $O_15$ being tangent at 5 to the circular arc $b'5$. Thus the meridian section of recess 3 comprises a cusp at $O_1$.

With such an ignition surface the flame fronts have shapes as indicated in dotted lines on FIG. 11. If it is desired to avoid a cusp such as $O_1$, the ignition surface may be chosen as one of said flame fronts, such as $O'_1$ $5_2$ $5_1$ $b'_2$ $b'_1$.

The separation surface $S_o$ (extending from $b'$ to $c$) between the slow burning powder B and the fast burning powder A is indicated on FIG. 11 by a line $b'c$ according to the first of the two solutions above indicated, where the respective flame fronts of the fast burning powder and of the slow burning powder constantly join each other on the separation surface $S_o$. In other words, at a given time, the respective flame fronts of said two powders intersect said separation surface along a line corresponding to a point of $b'c$.

Figure 12:
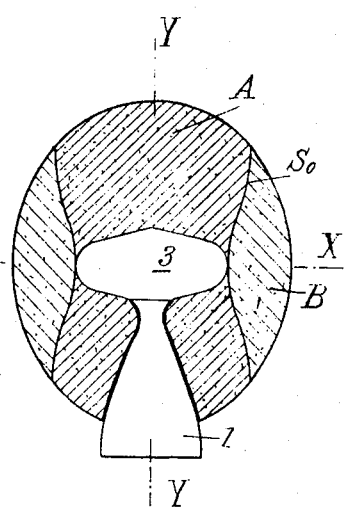
FIG. 12 is a diagrammatic axial sectional view of a rocket motor embodiment made according to FIG. 12.

FIG. 12 is a longitudinal section of a rocket motor made according to an embodiment of the principle illustrated by FIG. 11. Nozzle 1 is disposed along axis YY which is the axis of revolution. In this case the axis of thrust coincides with the axis of revolution.

But it should be well understood that the axis of thrust might be XX, perpendicular to the axis of revolution YY. In this case the nozzle would have its axis along XX.

It should also be well understood that, in a construction corresponding to the principle illustrated by FIG. 11, and where the axis of revolution is YY, the two portions above and below XX might be located at a distance from each other and be connected together by a cylindrical annular portion having its generatrices parallel to YY and made of slow burning powder, the axis of thrust being YY.

In another construction corresponding to the principle illustrated by FIG. 11, the two portions on each side of YY might be located at a distance from each other and be connected together by a cylindrical annular portion having generatrices parallel to XX, this cylindrical portion having an elongated cross section identical to the section of the above mentioned portion by plane YY perpendicular to XX and being made of fast burning powder.

Of course, if the two axes YY and XX are interchanged that is to say XX being the axis of revolution four constructions analogous to the preceding one relative to the revolution axis being YY would be further obtained.

Figure 13:
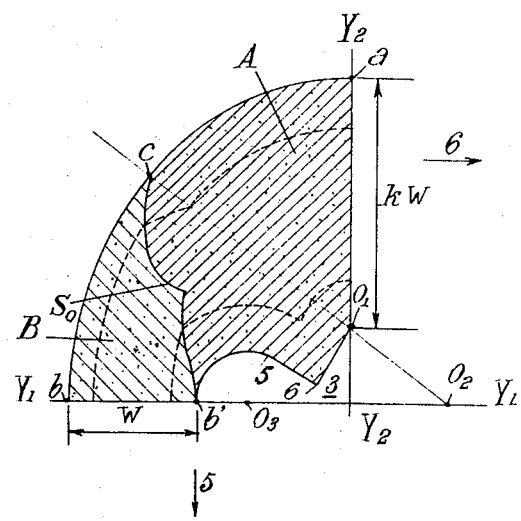
FIG. 13 is an explanatory view concerning the generation of spheroids.

FIG. 13 is a view analogous of FIG. 11 but corresponding to a construction which permits of increasing the ratio of the area of the ignition surface to the volume of recess 3 and to increase the number of available parameters.

The rocket motor is obtained by rotating the structure a quarter of which is shown by FIG. 13 either about axis $Y_1Y_1$ or about axis $Y_2Y_2$.

In this case the axial section of the ignition surface of recess 3 includes, as shown by FIG. 13 a circular arc $b'_5$ and a broken line 5, 6 $O_1$, portion 5, 6 being tangent at 5 to the circular arc $b'_5$.

As for the separation surface $S_o$, it includes a cusp.

As in the preceding case, according to the principle of FIG. 11, four constructions may be obtained by rotation about axis $Y_1Y_1$ and four other constructions by rotation about axis $Y_2Y_2$.

Figure 14:
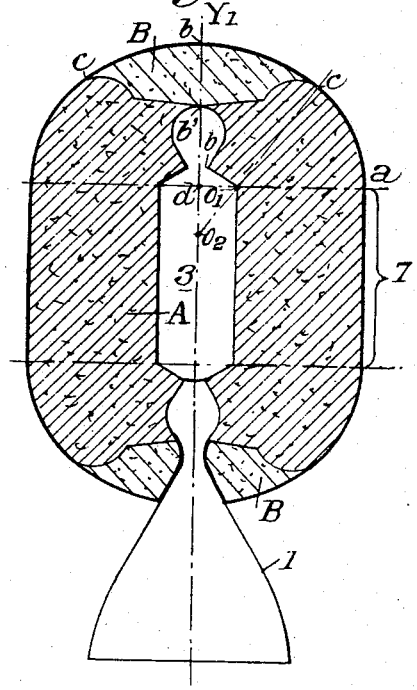
FIGS. 14 and 15 are diagrammatic axial sectional views of two respective rocket motor embodiments made according to FIG. 13.

One of these constructions, obtained by rotation about $Y_1Y_1$, is shown FIG. 14. In this case the two ends portions have been moved apart from each other and connected together by a cylindrical annular portion having generatrices parallel to $Y_1Y_1$ and made of fast burning powder.

Figure 15:
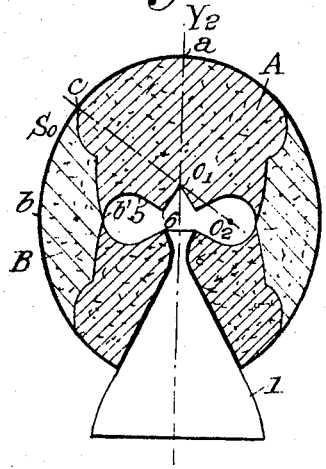

Another of these constructions, obtained by rotation about $Y_2Y_2$ is represented by FIG. 15.

Figure 16:
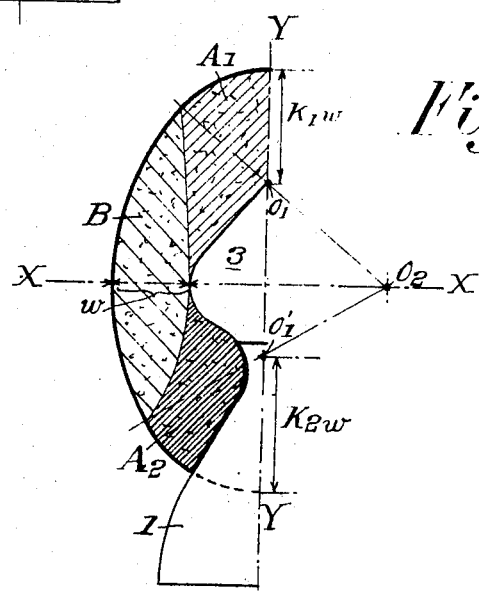
FIG. 16 is a diagrammatic axial sectional view of still another rocket motor embodiment according to the invention.

The embodiment of FIG. 16 is analogous to that of FIG. 12, the difference being that the end portion below axis XX has a diameter greater than the end portion above said axis XX.

In this case it is necessary to make use of three different powders having different respective velocities of combustion. The slow powder B is disposed in the same manner as the portion B of FIG. 12. As for portions $A_1$ and $A_2$ they correspond to the two portions of the fast burning powder shown at A on FIG. 12 but are located respectively above and below axis XX. If $r$ is the velocity of the powder portion B and $r_1$ and $r_2$ those of portions $A_1$ and $A_2$, $r$ is smaller than $r_1$ and $r_2$ and, since the radius of the top portion $A_1$ is smaller than that of the bottom portion of $A_2$, $r_1$ is also smaller than $r_2$.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What is claimed is:

1. A rocket motor which comprises, in combination, a shell of spheroidal shape having an axis of symmetry, nozzle means carried by said shell, and a mass of solid propellant fitting in said spheroidal shell, said solid propellant mass consisting of at least two different portions, one of these portions being made of a propellant burning slower than the remainder of the propellant mass and being called the slow burning portion, said mass of propellant having an ignition surface in communication with said nozzle means and located both on said slow burning portion and on at least one other portion of said propellant mass and the surface of separation between said slow burning portion and the remainder of the propellant mass being so shaped in relation to said ignition surface that no sliver is left at the end of the combustion of said solid propellant mass.

2. A rocket motor according to claim 1 wherein at most 10% of said ignition surface is located on said slow burning portion.

3. A rocket motor according to claim 1 wherein the part of said ignition surface located on said slow burning portion consists of one mere line.

4. A rocket motor according to claim 1, wherein the part of said ignition surface located on said slow burning portion consists of at least one mere point.

5. A rocket motor according to claim 1 wherein the part of said ignition surface located on said slow burning portion consists of at least one mere line and at least one mere point.

6. A rocket motor according to claim 1 wherein said nozzle means consist of a single nozzle symmetrical about said axis of symmetry.

7. A rocket motor which comprises, in combination, a shell of spheroidal shape having an axis of symmetry, nozzle means carried by said shell, and a mass of solid propellant fitting in said spheroidal shell, said solid propellant mass consisting of at least two different portions, one of these portions being made of a propellant burning slower than the remainder of the propellant mass and being called the slow burning portion, said mass of propellant being provided with a cavity, symmetrical about said axis of symmetry, in communication with said nozzle means and the wall of which forms an ignition surface located both on said slow burning portion and on at least one other portion of said propellant mass, and the surface of separation between said slow burning portion and the remainder of said propellant mass being so shaped in relation to said ignition surface that no sliver is left at the end of the combustion of said solid propellant mass.

8. A rocket motor according to claim 7 wherein said nozzle means start directly from said cavity.

9. A rocket motor according to claim 7 further comprising an inhibited passage in the propellant mass, connecting said cavity with said nozzle means.

10. A rocket motor according to claim 7 wherein said axis of symmetry is an axis of revolution for said shell, for said cavity and for said surface of separation.

11. A rocket motor which comprises, in combination, a shell of spherical shape, nozzle means carried by said shell, and a mass of solid propellant fitting in said spherical shell, said solid propellant mass consisting of two different portions both of revolution about a diameter of said shell, one of these portions being made of a propellant burning faster than that of the other, said two different portions being called the fast burning portion and the slow burning portion, respectively, said slow burning portion forming a lining for said shell over practically the whole of the inner wall thereof, said fast burning portion being provided with a cavity of revolution about said diameter, said cavity being in communication with said nozzle means and its wall forming an ignition surface, and the surface of separation between said two portions being of revolution about said diameter and so shaped in relation to said ignition surface that no sliver is left at the end of the combustion of said solid propellant mass.

12. A rocket motor according to claim 11 wherein the wall of said cavity is the surface generated by the rotation about said diameter of a curve located in a plane passing through said diameter and consisting of two apex opposed lobes, said curve having two axes of symmetry at right angles to each other and intersecting each other at the center of said spherical shell, the first of said axes of symmetry intersecting said curve at said center and at two points of the respective lobes thereof located symmetrically on opposite sides of said center and the second of said axes of symmetry intersecting said curve only at said center, said surface of separation between said fast burning portion and said slow burning portion being the surface generated by the rotation about said shell diameter of an oval curve located in a plane passing through said diameter, said oval curve being tangent to said first mentioned curve at the points of intersection of said first axis of symmetry with said first mentioned curve, said oval curve being tangent to said shell at the points of intersection of said second axis of symmetry with said shell, one of said axes of symmetry coinciding said diameter of said shell.

13. A rocket motor according to claim 12 wherein the axis of symmetry that coincides with said diameter of said shell is said first axis of symmetry.

14. A rocket motor which comprises, in combination, a shell of spherical shape, nozzle means carried by said shell, and a mass of solid propellant fitting in said spherical shell, said solid propellant mass consisting of two different portions both of revolution about a diameter of said shell, one of these portions being made of a propellant burning faster than the other, said different portions being called the fast burning portion and the slow burnin portion, respectively, said mass of propellant being provided with a cavity, of revolution about said diameter and longitudinally offset with respect to the center of said shell, said cavity being in communication with said nozzle means, the wall of said cavity forming an ignition surface and being located both on said fast burning portion and on said slow burning portion, but mostly on said fast burning portion, and the surface of separation between said two portions being of revolution about said diameter and so shaped in relation to said ignition surface that no sliver is left at the end of the combustion of said solid propellant mass.

15. A rocket motor according to claim 14 wherein said slow burning portion is located in the front part of said shell, and said cavity has a rounded front end the concavity of which is turned toward the rear and the center of curvature of which is located beyond the center of said shell in the frontward direction, said rounded front end being tangent to the surface of separation between said two propellant portions, said nozzle means consisting of a nozzle having its axis along said diameter.

16. A rocket motor which comprises, in combination, a shell obtained by rotation of a closed curve having two axes of symmetry at right angles to each other about one of said axes called axis of revolution, said closed curve comprising two convex portions consisting of two circular arcs of the same radius having their respective centers on one of said axes and two intermediate portions tangent to both of said circular arcs and connecting them together, nozzle means carried by said shell and disposed about one of said axes of symmetry and a mass of solid propellant fitting in said shell, said solid propellant mass consisting of two different portions, both of revolution about said axis of revolution, one of these portions being made of a propellant burning faster than the other, said propellant portions being called the fast burning portion and the slow burning portion, respectively, said mass of propellant being provided with a cavity the wall of which is the surface obtained by rotation about said axis of revolution of a second curve having the same symmetry axes as said first mentioned curve, said cavity being in communication with said nozzle means and the wall of said cavity forming an ignition surface located both on said fast burning portion and on said slow burning portion, and the surface of separation between said two portions being so shaped in relation to said ignition surface as to form no sliver.

17. A rocket motor according to claim 16 in which said ignition surface is limited, in the slow burning portion, to a mere line.

18. A rocket motor according to claim 16 wherein said mass of solid propellant consists of two fast burning portions extending from said cavity on opposite sides thereof respectively as far as the two surfaces generated by said circular arcs and of a slow burning portion annularly surrounding said cavity and said two fast burning portions.

19. A rocket motor according to claim 16 wherein said mass of solid propellant consists of one fast burning portion, which surrounds said cavity about said axis of revolution, and of two slow burning portions each directly surrounding one end of said axis of revolution, the outer surface of each of said two slow burning portions being generated by one of said circular arcs, respectively, the two surfaces of separation between said fast burning portion and each of said slow burning portions being each tangent to said cavity at the respective points where it intersects said axis of revolution.

20. A rocket motor which comprises, in combination, a shell obtained by rotation of a closed curve about an axis of revolution which is an axis of symmetry for said curve, said closed curve comprising two convex end portions consisting of circular arcs of different respective radii having their respective centers on said axis and two intermediate portions tangent to both of said circular arcs and connecting them together, nozzle means carried by said shell and disposed about said axis of symmetry, and a mass of solid propellant fitting in said shell, said solid propellant mass consisting of three different portions, of revolution about said axis of revolution, one of these portions being made of a propellant burning more slowly than the two others which themselves have two different combustion velocities, respectively, said first mentioned propellant portion being called the slow burning portion, and the two other propellant portions being called the fast burning portions, said mass being provided with a cavity the wall of which is the surface obtained by rotation about said axis of revolution of a second curve having said axis of revolution as axis of symmetry, said cavity being in communication with said nozzle means and the wall of said cavity forming an ignition surface located both on said slow burning portion and on said fast burning portions, and the surfaces of separation between said slow burning portion and each of said fast burning portions being so shaped in relation to said ignition surface as to form no sliver, said two fast burning portions extending from said cavity on opposite sides thereof respectively as far as the two end surfaces generated by said circular arcs and said slow burning portion annularly surrounding said cavity and said fast burning portions.

21. A rocket motor which comprises, in combination, a shell of substantially uniform thickness and of spheroidal shape having at least one axis of symmetry, the front and rear end portions of said shell being semispherical and of revolution about said axis, nozzle means carried by said shell opening toward the rear, and a mass of solid propellant fitting in said shell, said solid propellant mass consisting of two different portions both of revolution about said axis of symmetry, one of these portions being made of a propellant burning faster than that of the other, said two different portions being called the fast burning portion and the slow burning portion, respectively, said slow burning portion forming a lining for said shell over practically the whole of the inner wall thereof, said fast burning portion being provided with a cavity of revolution about said axis of symmetry, said cavity being in communication with said nozzle means and its wall forming an ignition surface, and the surface of separation between said two portions being of revolution about said axis of symmetry and so shaped in relation to said ignition surface that no sliver is left at the end of the combustion of said solid propellant mass.

References Cited by the Examiner
UNITED STATES PATENTS

| | | | |
|---|---|---|---|
| 3,001,363 | 9/1961 | Thibodaux et al. | 60—35.6 |
| 3,002,459 | 10/1961 | Harper | 102—98 |
| 3,014,427 | 12/1961 | Scurlock | 102—98 |
| 3,052,092 | 9/1962 | Kirkbride | 60—35.6 X |
| 3,073,242 | 1/1963 | Hewson | 102—98 |
| 3,120,737 | 2/1964 | Holloway | 60—35.6 X |
| 3,121,309 | 2/1964 | O'Donnell | 60—35.6 |

OTHER REFERENCES

ARS Journal, vol. 29, No. 8, August 1959, pp. 598–600 relied on.

MARK NEWMAN, *Primary Examiner.*

CARLTON R. CROYLE, *Examiner.*